United States Patent
Kim et al.

(10) Patent No.: US 12,067,777 B2
(45) Date of Patent: Aug. 20, 2024

(54) EFFICIENT VIDEO PROCESSING VIA DYNAMIC KNOWLEDGE PROPAGATION

(71) Applicant: QUALCOMM Incorporated, San Diego, CA (US)

(72) Inventors: Hanul Kim, Uijeongbu-si (KR); Mihir Jain, Amsterdam (NL); Juntae Lee, Seoul (KR); Sungrack Yun, Seongnam (KR); Fatih Murat Porikli, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 338 days.

(21) Appl. No.: 17/654,986

(22) Filed: Mar. 15, 2022

(65) Prior Publication Data

US 2022/0301310 A1  Sep. 22, 2022

Related U.S. Application Data

(60) Provisional application No. 63/162,440, filed on Mar. 17, 2021.

(51) Int. Cl.
*G06V 20/40* (2022.01)
*G06V 10/82* (2022.01)
*H04L 67/04* (2022.01)

(52) U.S. Cl.
CPC .............. *G06V 20/46* (2022.01); *G06V 10/82* (2022.01); *H04L 67/04* (2013.01)

(58) Field of Classification Search
CPC ......... G06V 20/46; G06V 10/82; H04L 67/04
(Continued)

(56) References Cited

U.S. PATENT DOCUMENTS 10,567,237 B1 * 2/2020 Powell .................. H04L 41/16
11,616,839 B2 * 3/2023 Sharma ................. G06N 20/00
706/12
(Continued)

FOREIGN PATENT DOCUMENTS

CA       3164902 A1 *  7/2021  ........... G06F 18/214
CN     112789631 A  *  5/2021  ............. G06F 3/013
(Continued)

OTHER PUBLICATIONS

Feichtenhofer C., et al., "SlowFast Networks for Video Recognition", arXiv:1812.03982v3 [cs.CV], Oct. 29, 2019, 10 pages.
(Continued)

*Primary Examiner* — Mahendra R Patel
(74) *Attorney, Agent, or Firm* — Patterson + Sheridan, L.L.P.

(57) ABSTRACT

Certain aspects of the present disclosure provide a method of processing video data. In one example, the method includes receiving input video data; sampling a first subset of clips from the input video data; providing the first subset of clips to a first component of a machine learning model to generate first output; sampling a second subset of clips from the input video data, wherein the second subset of clips comprises fewer clips than the first subset of clips; providing the second subset of clips to a second component of the machine learning model to generate a second output; aggregating the first output from the first component of the machine learning model with the second output from the second component of the machine learning model to generate aggregated output; and determining a characteristic of the input video data based on the aggregated output.

30 Claims, 5 Drawing Sheets

(58) Field of Classification Search
USPC .......................................................... 382/156
See application file for complete search history.

(56) References Cited

U.S. PATENT DOCUMENTS

| | | | | |
|---|---|---|---|---|
| 11,776,273 | B1* | 10/2023 | Chen | G06N 20/20 382/224 |
| 2018/0025303 | A1* | 1/2018 | Janz | G16H 50/20 705/2 |
| 2019/0114487 | A1* | 4/2019 | Vijayanarasimhan | G06V 20/30 |
| 2019/0294927 | A1* | 9/2019 | Guttmann | G10L 15/065 |
| 2020/0184606 | A1* | 6/2020 | Elron | G06T 5/70 |
| 2020/0279156 | A1* | 9/2020 | Cai | G06V 10/764 |
| 2020/0293783 | A1* | 9/2020 | Ramaswamy | G06F 18/256 |
| 2020/0302301 | A1* | 9/2020 | Anderson | G06N 3/08 |
| 2020/0322677 | A1* | 10/2020 | Kovacs | H04N 21/6582 |
| 2021/0097401 | A1* | 4/2021 | Ramalho | G06N 3/045 |
| 2021/0110014 | A1* | 4/2021 | Turgeman | G06F 11/3419 |
| 2021/0133497 | A1* | 5/2021 | Faller | G06F 18/217 |
| 2022/0197796 | A1* | 6/2022 | Rumanek | G06F 12/0813 |
| 2023/0274132 | A1* | 8/2023 | Cai | G06N 3/08 706/15 |

FOREIGN PATENT DOCUMENTS

| | | | | |
|---|---|---|---|---|
| CN | 116648912 | A * | 8/2023 | ............. G06T 9/002 |
| DE | 102020103409 | A1 * | 12/2020 | ............. A63F 13/23 |
| WO | WO-2020185256 | A1 * | 9/2020 | ......... G06K 9/00221 |

OTHER PUBLICATIONS

Gao R., et al., "Listen to Look: Action Recognition by Previewing Audio", In Proceedings of the IEEE Conference on Computer Vision and Pattern Recognition (CVPR), 2020, 11 pages.

Meng Y., et al., "AR-Net: Adaptive Frame Resolution for Efficient Action Recognition", arXiv:2007.15796v1 [cs.CV], Jul. 31, 2020, 25 pages.

Tan M., et al., "EfficientNet: Rethinking Model Scaling for Convolutional Neural Networks", Proceedings of the 36th International Conference on Machine Learning, Long Beach, California, PMLR 97, 2019, 10 Pages.

Wang X., et al., "Non-local Neural Networks", arXiv:1711.07971v3 [cs.CV], Apr. 13, 2018, 10 pages.

* cited by examiner

EFFICIENT VIDEO PROCESSING VIA DYNAMIC KNOWLEDGE PROPAGATION

CROSS-REFERENCE TO RELATED APPLICATIONS

This Application claims the benefit of and priority to U.S. Provisional Patent Application No. 63/162,440, filed on Mar. 17, 2021, the entire contents of which are incorporated herein by reference.

INTRODUCTION

Aspects of the present disclosure relate to efficient machine learning models for processing video data.

Machine learning is generally the process of producing a trained model (e.g., an artificial neural network), which represents a generalized fit to a set of training data. Applying the trained model to new data enables production of inferences, which may be used to gain insights into the new data.

As the use of machine learning has proliferated for enabling various machine learning (or artificial intelligence) tasks, the need for more efficient processing of machine learning model data has arisen. Given their computational complexity, machine learning models have conventionally been processed on powerful, purpose-built computing hardware. However, there is a desire to implement machine learning tasks on lower power devices, such as mobile device, edge devices, always-on devices, Internet of Things (IoT) devices, and the like. Implementing complex machine learning tasks, such as action recognition in video data, on lower power devices creates new challenges with respect to the design constraints of such devices, such as with respect to power consumption, computational efficiency, and memory footprint, to name a few examples.

Accordingly, systems and methods are needed for improving the efficiency of machine learning model processing for processing video data.

BRIEF SUMMARY

Certain aspects provide a method of processing video data, including: receiving input video data; sampling a first subset of clips from the input video data; providing the first subset of clips to a first component of a machine learning model to generate first output; sampling a second subset of clips from the input video data, wherein the second subset of clips comprises fewer clips than the first subset of clips; providing the second subset of clips to a second component of the machine learning model to generate a second output; aggregating the first output from the first component of the machine learning model with the second output from the second component of the machine learning model to generate aggregated output; and determining a characteristic of the input video data based on the aggregated output.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
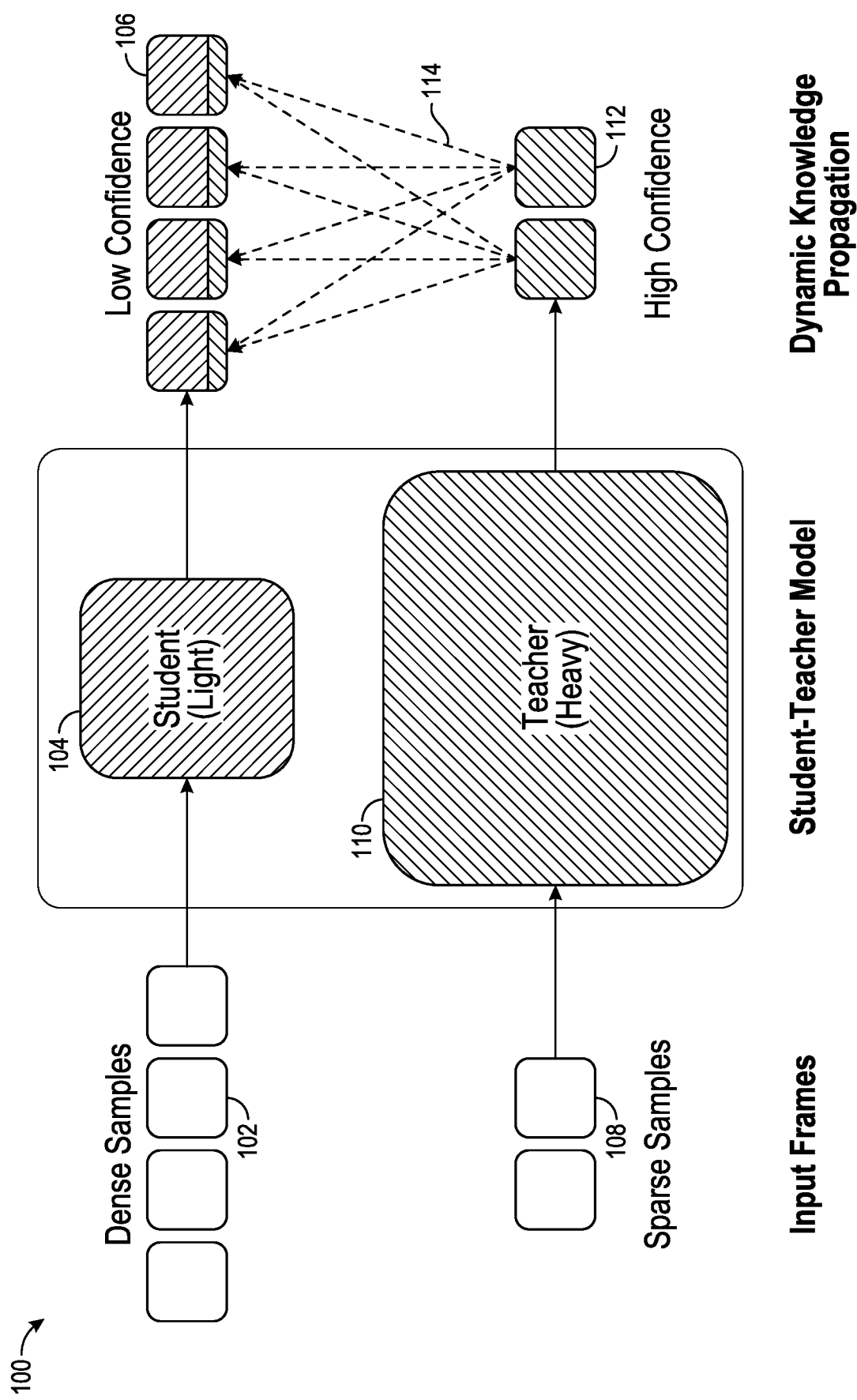
FIG. 1 depicts an example student-teacher model architecture.

Aspects of the present disclosure provide apparatuses, methods, processing systems, and non-transitory computer-readable mediums for improving the efficiency of machine learning model processing of video data. For example, the processing may be used to determine various characteristics of video data, such as classifying the video as a whole, determining and localizing actions that happen in the video, and others. Video action classification is described in various examples herein as one example, but note that the video processing aspects described herein have myriad applications to machine learning-based video processing.

Video action classification is a fundamental problem for video understanding. There have been many attempts to develop accurate action classification methods, which have generally benefited from advances in deep learning. Recent state-of-the-art methods concentrate on building clip-level models that perform over short time windows. Given the clip-level features generated by the clip-level models, such methods densely predict action classes for each clip and aggregate prediction scores across all of the clips to recognize and classify video actions. These methods yield good results on large-scale datasets; however, they require significant computational resources, making such methods impractical for real-world applications. For example, such methods may generally not be applicable to lower power processing devices, such as mobile devices.

The video processing models described herein, by contrast, combine smaller, lighter-weight neural network model components with larger, heavier-weight neural network model components to achieve efficient video characteristic determination, such as classifying a video, determining and localizing actions in a video, video understanding, video inpainting (e.g., for filling spatio-temporal holes in video data with plausible content, such as for video restoration, object removal, etc.), video question-answering (e.g., for retrieving temporal and spatial information from video data and interpreting it), and the like. In some aspects, the smaller models are referred to as "student" models that "learn" from the larger "teacher" models.

Generally, a student model processes more input video frames as compared to a teacher model, but generates less accurate output features compared to the teacher model. Conversely, the teacher model generally processes fewer frames as compared to the student model, but generates more accurate output features. In the model architectures described herein, the teacher model's "knowledge" is shared with the student model via dynamic knowledge propagation to yield accurate feature output covering a wide range of input frames. Beneficially, the ratio of input frames considered by each of the student model and the teacher model may be configured based on performance needs and tradeoffs, and so the student-teacher architectures described herein provide a more flexible framework as compared to conventional model architectures. Further, the student-teacher model architectures described herein generally outperforms conventional model architectures, including those based on end-to-end "heavy" models.

For example, the model architectures described herein are more flexible and accurate than conventional approaches, such as those that rely on temporally separable convolution. While temporally separable convolution approaches reduce the computational cost per clip, they nevertheless require significant computation when the length of a video increases, which limits their usefulness in various device capability contexts.

As another example, model architectures described herein outperform approaches focused on decreasing the number of clips through sampling schemes because such approaches tend to significantly degrade classification accuracy, even when they learn an effective sampling strategy. By contrast, the model architectures described herein use configurable sampling rates between student and teacher models to improve accuracy while beneficially reducing computational complexity.

One way in which the model architectures described herein improve upon conventional methods is the use of dynamic knowledge propagation for efficient video processing, which conveys the information of relatively larger models (e.g., complex neural networks) to relatively smaller models (e.g., simpler neural networks) using attention techniques, such as cross-attention. In some aspects, such attention techniques generate a mapping between queries and key-value pairs, which allows for aggregating the knowledge from both the larger (teacher) and smaller (student) neural networks. Generally, an attention mechanism calculates dynamic weights representing the relative importance of inputs in a sequence (the keys) for a particular output (the query). Multiplying the dynamic weights with the input sequence produces the values, which will then weight the sequence. In this way, attention mechanisms beneficially enable leveraging the relationships between heterogeneous representations, such as those created by the student and teacher models.

Accordingly, aspects described herein generally improve upon conventional techniques by implementing dynamic knowledge propagation based on attention techniques that transfer information from one model (e.g., a teacher neural network) to another (e.g., a student neural network) during inference time. The knowledge propagation between teacher and student models allows the models to be combined in such a way as to reduce computational costs while maintaining improved model performance for the task at hand (e.g., classification).

Example Student-Teacher Model Architecture

FIG. 1 depicts an example student-teacher model architecture 100.

In the depicted example, a lightweight (e.g., relatively less complex in terms of number of layers, number of nodes, number of connections, number of parameters, etc.) student model 104 processes dense samples 102 from an input data stream, such as sample frames from a video data stream. In the case of video data, the density of the sampling may be defined by the number of frames that are sampled out of the underlying data framerate of the video, such as 1 in every 2 frames (50% sampling rate). The student model 104 produces output features 106, which may be described as relatively lower confidence features given the lightweight nature of student model 104.

Teacher model 110 on the other hand processes sparse samples 108 from the input data stream. Here, the sampling rate may instead be, for example, 1 in every 4 frames (25% sampling rate). Note that while sparse samples 108 may be sampled from the same input data stream as dense samples 102, in some aspects, sparse samples 108 and dense samples 102 share no common samples; that is, in such aspects, a particular sampled frame is sampled by one of student model 104 or teacher model 110, but not both.

Teacher model 110 produces output features 112, which are generally more confident predictors as compared to output features 106. In order to leverage these higher confidence features, they may be propagated (as indicated by arrows 114) to the lower confidence features through attention mechanisms, as described in more detail with respect to FIG. 2.

Figure 2:
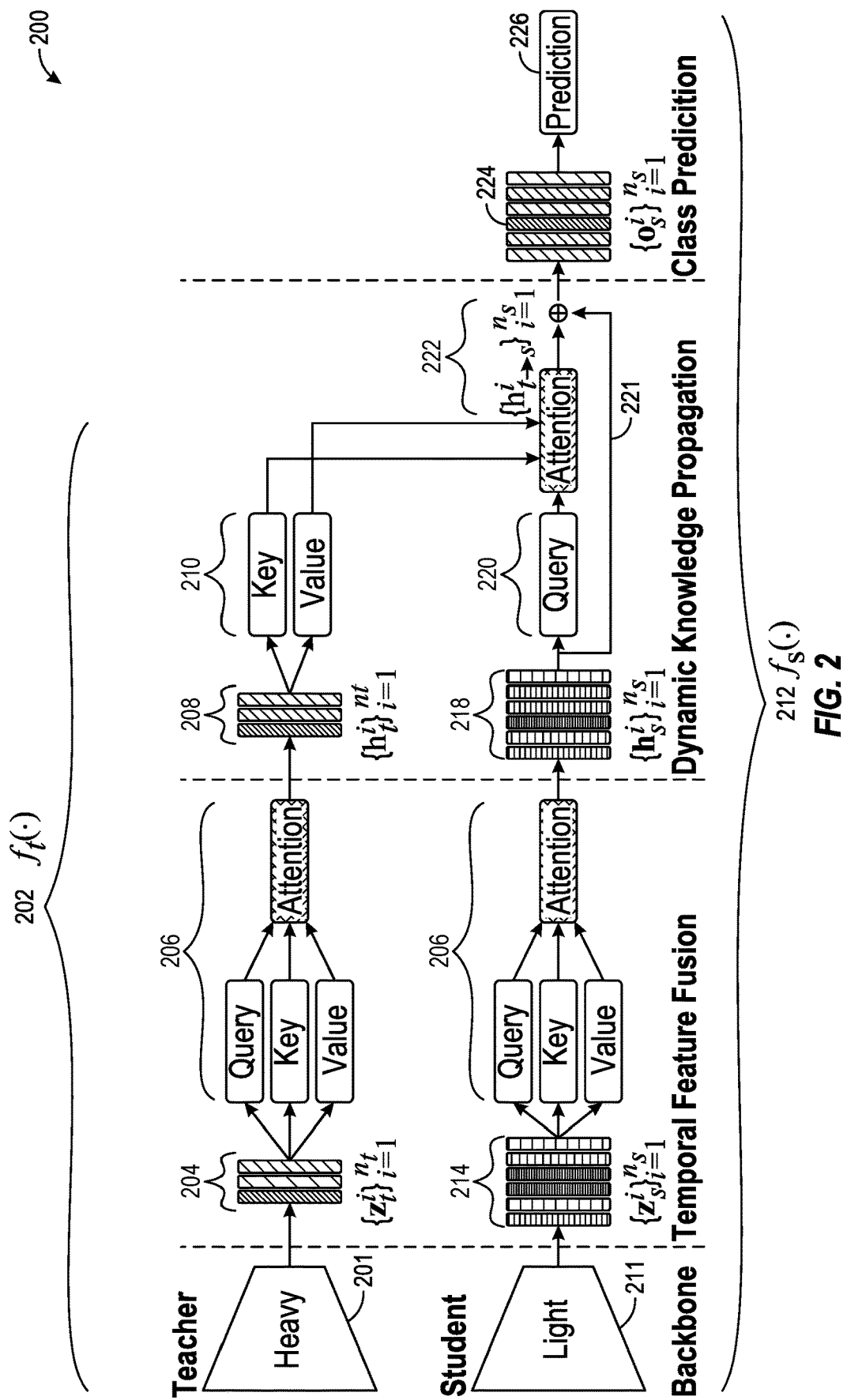
FIG. 2 depicts an example video processing model architecture using student and teacher models.

Example Video Classification Model Architecture with Student and Teacher Model Components FIG. 2 depicts an example video processing model architecture 200 using student and teacher models.

In particular, model architecture 200 includes student model 212, which may be denoted as $f_s(\cdot)$, and teacher model 202, which may be denoted as $f_t(\cdot)$. In this example, student model 212 has lower computation costs compared to teacher model 202, and is thus configured to process many clips to determine a characteristic about an incoming data stream, such as recognizing a video action class of an incoming video data stream. On the other hand, teacher model 202 has higher computation costs compared to student model 212, and is thus configured to process fewer sampled clips to efficiently convey more accurate information to the student through dynamic knowledge propagation. Generally, a clip refers to a portion of an input video stream, which may include, for example, some set number of image frames, or a number of frames during a fixed period of time, or a number of sampled image frames from a stream of image frames, or the like.

In some cases, both student model 212 and teacher model 202 include a backbone (211 and 201, respectively) and a temporal feature fusion component (216 and 206, respective), as explained further below.

Backbone networks 201 and 211 generally extract features from input data, such as input video clips in this example. In the depicted example, student model 212 employs a lighter backbone 201 and a lower resolution input (e.g., 112×112 pixels in one example) to reduce computation cost, whereas teacher model 202 uses a heavier backbone 201 that takes a higher resolution input (e.g., 224×224 in one example) to exploit more accurate information. In some cases, student model backbone 211 and teacher model backbone 201 may be neural networks.

Temporal feature fusion networks 206 (for teacher) and 216 (for student) are generally configured to mix the feature representations of different clips. Note that, unlike image classification, a video action is generally recognized by a sequence of clips. Thus, aggregating clip information over time is useful for accurate video action recognition. To this end, the temporal feature fusion networks 206 and 216 are configured to perform a self-attention technique using three linear projection layers to generate queries, keys, and values. In this example, the query and key dimensions are set to $d_k$, and the dimension of value is the same as the input feature. The outputs of the temporal fusion networks network $\{h_t^i\}_{i=1}^{n_t}$ and $\{h_s^i\}_{i=1}^{n_s}$, where subscripts s and t indicate student and teacher features, respectively, and i indexes the feature, are obtained via Equation 1, below.

Unlike teacher model 202, student model 212 also contains a dynamic knowledge propagation network, to leverage the teacher model's more accurate output, and a class prediction network, to determine a characteristic of the input data, such as to determine a video action in input video data. Note that the overall computation cost of model architecture 200 generally depends on the design of student model 212 and teacher 202 as well as the number of sampled clips processed by each model. Beneficially, each of these aspects is configurable to meet different device and/or performance needs.

In order to demonstrate the action of model architecture 200, consider a sequence of input frames for each model $\{x_s^i\}_{i=1}^{n_s}$ and $\{x_t^i\}_{i=1}^{n_t}$, where $n_s$ and $n_t$ are the number of frames of the student model's (212) inputs and teacher model's (202) inputs, respectively. In this example, the input frame x is an RGB image of spatial size H×W, where H and W are frame height and width, and in this example the input frame has a channel dimensionality C of three for the red, green, and blue color channels. Given input sequences, both student model 212 and teacher model 202 produce features 218 and 208, respectively, which may also be referred to as $\{h_s^i\}_{i=1}^{n_s}$ and $\{h_t^i\}_{i=1}^{n_t}$, respectively.

As above, dynamic knowledge propagation aims to transfer teacher model's 202 "knowledge" to student model 212 by analyzing features through a cross-attention technique. In this example, the attention mechanism is a mapping between a query generated by student model 212 and a set of key-value pairs generated by teacher model 202 that determine outputs as a weighted sum of the values, where query, key, and value are all vectors. Unlike self-attention, where all components come from the same inputs through different projections, the cross-attention technique beneficially assumes that queries and key-value pairs come from different models.

More specifically, the student model 212 projects its features $\{h_s^i\}_{i=1}^{n_s}$ (218) to queries $\{q_s^i\}_{i=1}^{n_s}$ (220) using a linear layer, while the teacher model 202 transforms its features $\{h_t^i\}_{i=1}^{n_t}$ (208) to key-value pairs $\{(k_t^i, v_t^i)\}_{i=1}^{n_t}$ (210) using another linear layer. Then, the cross-attention aggregation of student features and teacher features (222) is defined by:

$$h_{t \to s}^k = \sum_i \frac{\exp(q_s^k \cdot k_t^i / \tau)}{\sum_j \exp(q_s^k \cdot k_t^j / \tau)} \cdot v_t^i \quad (1)$$

where $\tau$ is the temperature hyperparameter to scale the dot-product and k corresponds to the feature of kth query $q_s^k$. In one example, $\tau$ may be set to the square root of the key's dimension $\sqrt{d_k}$. Note that student features (218) are replaced with the weighted sum of teacher features via Equation 1, where these attention weights are determined by scaled dot-product similarities between queries and keys. In other words, the cross-attention conveys the teacher's knowledge to the student by updating the features of student model 212 (queries) referring to the knowledge of the features of teacher model 202 (key and values).

Thus, if $h_{t \to s}^i$, denotes the propagated feature via Equation 1, then the output 224, of the dynamic knowledge propagation network, which may be denoted as $o_s^i$, may be determined as:

$$o_s^i = h_s^i + h_{t \to s}^i \quad (2)$$

Note that the residual connection 221, which adds $h_s^i$ to $h_{t \to s}^i$, helps to preserve the statistics (or characteristics) of the original features $h_s^i$ so that $o_s^i$ does not significantly deviate from $h_s^i$. Further, note that the first term $h_s^i$ comes entirely from the student model 212, and the second term $h_{t \to s}^i$, is the modified teacher information according to the first term.

The class prediction network 226 may be implemented as a simple linear classifier in some examples. Given $\{o_s^i\}_{i=1}^{n_s}$, the class prediction network 226 estimates the score $s_j^i$ indicating the confidence that the ith clip belong to the jth action class. The top-k clips can then be collected according to maximum confidence score, and their scores may be averaged to determine the video action class. In some cases, k is set proportional to the number of clips. Specifically:

$$k = \left\lfloor \frac{n_s}{\gamma} \right\rfloor \quad (3)$$

where $\lfloor \cdot \rfloor$ denotes the floor operation. By dividing $n_s$ with a fixed hyperparameter $\gamma$, k is varied depending on the number of frames $n_s$. Then, k is larger on long duration videos.

As above, in this example, video action classes are used as an example characteristic determined by model architecture 200, but in other examples, other characteristics may be determined.

Training of Video Classification Model

Model architecture 200 may generally be trained in two-stages. First, a video classification loss (an example of a task loss) $\mathcal{L}_v$ is minimized to train teacher model 202. Then, student model 212 is trained by minimizing the sum of the three losses: video classification loss $\mathcal{L}_v$, clip classification loss $\mathcal{L}_c$, and knowledge distillation loss $\mathcal{L}_k$. Thus, in this example, the loss functions for the student model ($\mathcal{L}_s$) and teacher model ($\mathcal{L}_t$) may be defined as:

$$\mathcal{L}_t = \mathcal{L}_v \quad (4)$$

$$\mathcal{L}_s = \mathcal{L}_v + \lambda_c \mathcal{L}_c + \lambda_k \mathcal{L}_k \quad (5)$$

where $\lambda_c$ and $\lambda_k$ are hyperparameters to control the contribution of clip classification and knowledge distillation losses in this example.

Video classification loss generally penalizes prediction errors of student model 212, which estimates the softmax probabilities of action classes in this example. As above, determining different characteristics of the input data may be used as tasks in other examples. Given an input video $\mathcal{V}$ and its label y, the video classification loss is defined by:

$$\mathcal{L}_v(\mathcal{V};s) = CE(y,y), \quad (6)$$

where CE is the cross entropy loss function, and y means the softmax probabilities, obtained from confidences scores, in this example.

In this case, the action recognition is weakly supervised, which means the ground-truth labels for a clip level are not available. Instead, teacher model 202 generates pseudo labels for clip level predictions. And then the student model 212's predictions are encouraged to be similar to teacher model 202's predictions. This may be accomplished by defining the clip classification loss by:

$$\mathcal{L}_c(\mathcal{V}; s, t) = \frac{1}{n_s} \sum_{i=1}^{n_s} CE(y_s^i, y_t^i), \quad (7)$$

where $y_s^i$ and $y_t^i$ are the softmax probabilities of the student model output and teacher model output, respectively. Note that the clip classification loss can be considered a kind of knowledge distillation in that it trains the student model 212 to mimic the teacher model 202.

The attention technique replaces queries with values according to the scaled dot-product similarities between queries and keys. And queries and keys come from student model 212 and teacher model 202 in the cross-attention method. Therefore, given an input frame, cross-attention helps make student model 212 and teacher model 202 produce similar features for accurate dynamic knowledge propagation.

To this end, a knowledge distillation method may be applied. Let $q_i$ and $k_i$ denote the query and key corresponding to the ith clip obtained from student model 212 and teacher model 202. A distance metric, such as cosine similarity, may then be maximized between these features according to:

$$\mathcal{L}_k(\mathcal{V}; s, t) = -\frac{1}{n_s} \sum_{i=1}^{n_s} \frac{q_s^i \cdot k_t^i}{\|q_s^i\| \|k_t^i\|} \quad (8)$$

Example Sampling Method

Figure 3:
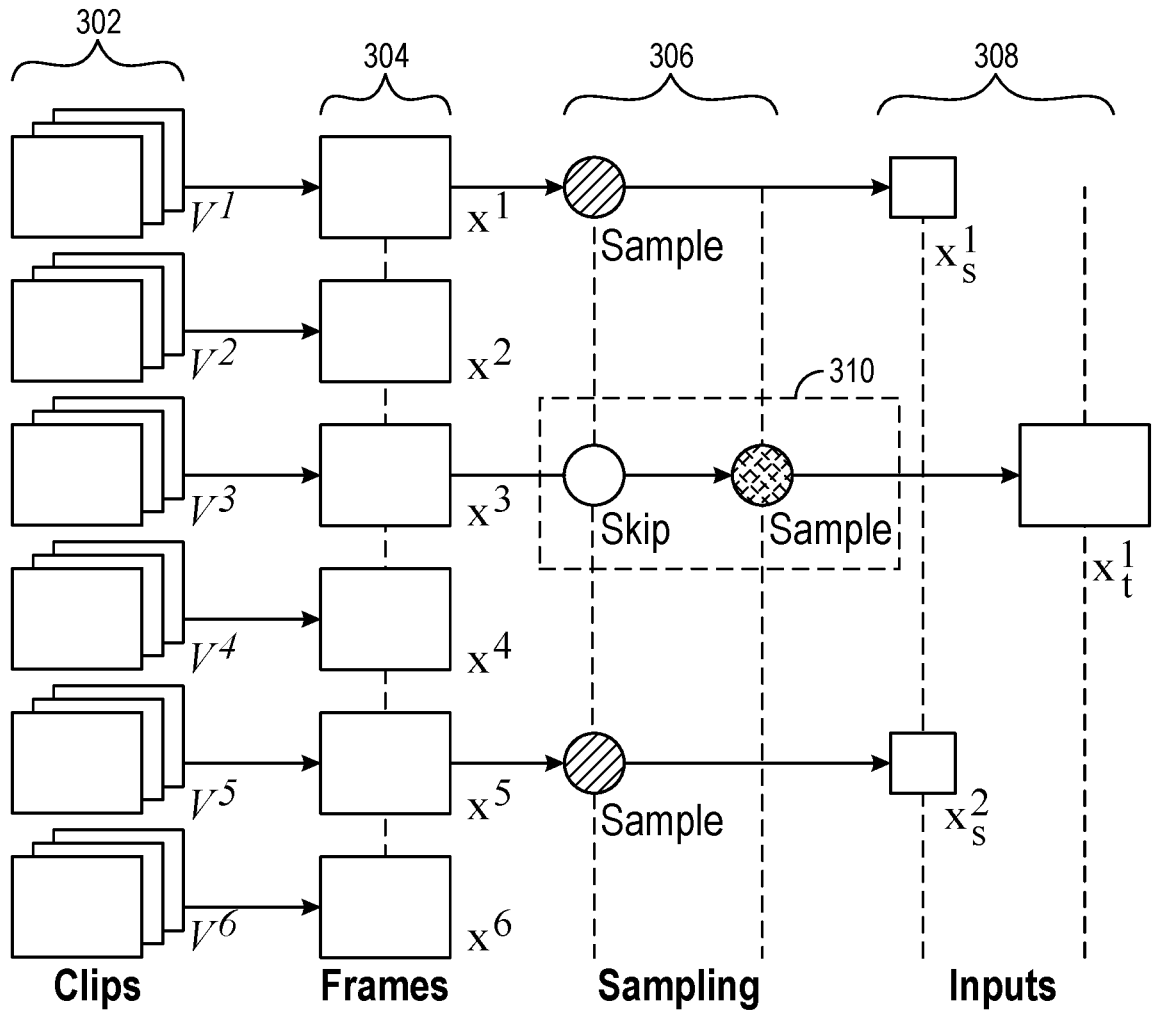
FIG. 3 depicts an example sampling method.

FIG. 3 depicts an example sampling method 300, which may be used, for example, to generate input data for student model 212 and teacher model 202 in FIG. 2.

Let $\mathcal{V}$ and y be a video and its label, where the video $\mathcal{V}$ is a sequence of clips 302 ($V^i$), which each may include one or more frames, and the label y is a one-hot vector indicating the action in the video $\mathcal{V}$. The ith clip $V^i$ may be considered as a single frame $x^i \in \mathbb{R}^{H \times W \times 3}$ because multiple frames in a short time interval generally include a significant amount of redundant information. Thus, in this example, a sampled frame (e.g., $x^i$) represents its clip (e.g., $V^i$) efficiently by reducing computation cost without significant performance degradation.

Given a sequence of clips 304, which may be denoted by $\{x^i\}_{i=1}^T$, uniform sampling (306) may be performed to prepare input sequences 308 with sampling interval $r_s$ and $r_t$ for student and teacher models, respectively. For instance, if a video has T frames, $n_s=T/r_s$ frames may be sampled for the student model. Note that the sampling interval $r_t$ is larger than $r_s$, to reduce the computation cost of the teacher model by reducing the number of input clips. As FIG. 3 illustrates, in this example, each clip is used in one of the two models, and if one clip is sampled simultaneously for both student and teacher models (e.g., at 310), then it is used for the teacher model.

Example Method of Classifying Video Data

Figure 4:
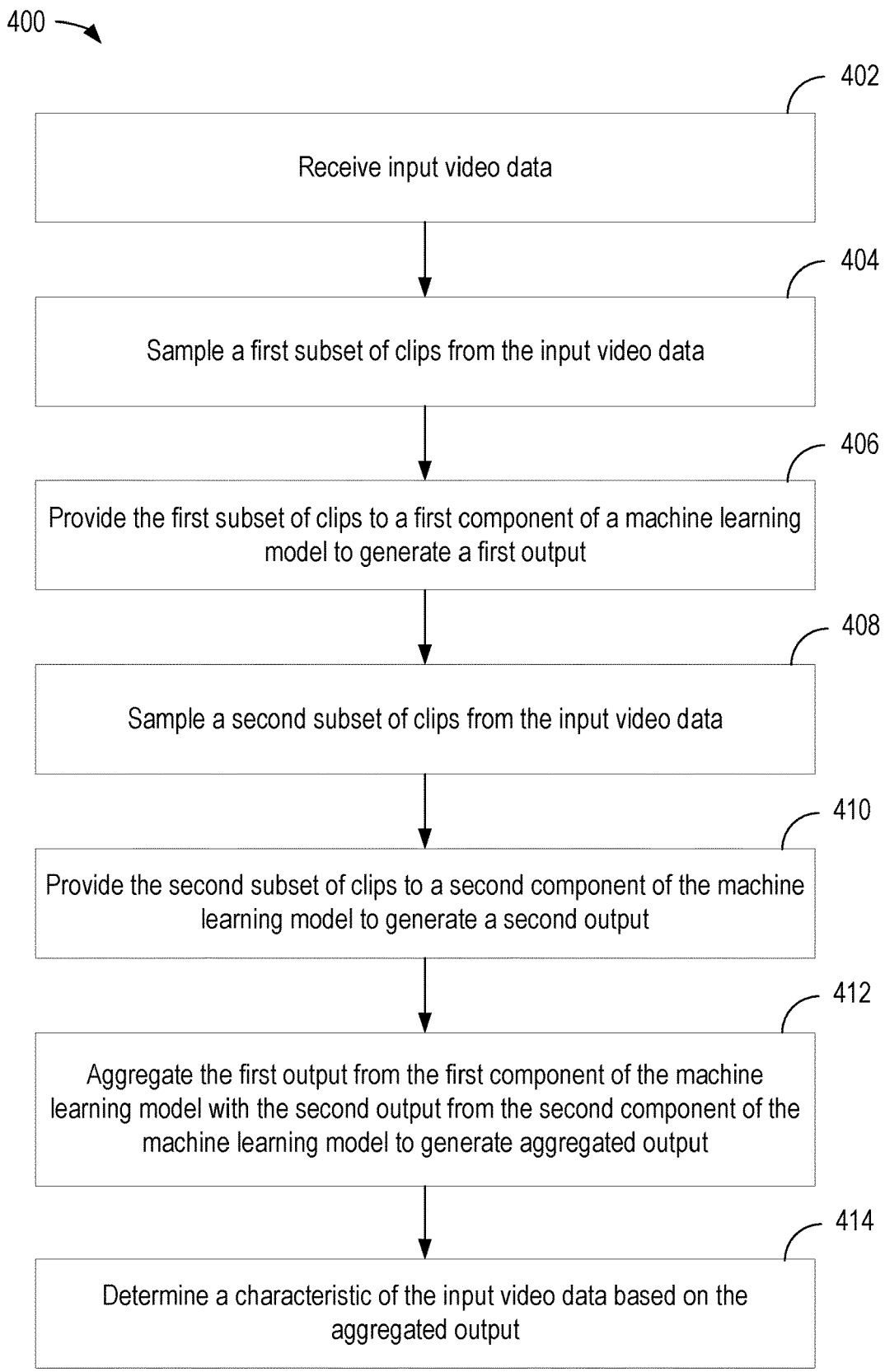
FIG. 4 depicts an example method for processing video data.

FIG. 4 depicts an example method 400 for processing video data, such as using model architecture 200 of FIG. 2. As in the examples described herein, method 400 may be used to perform video classification, video action determination and localization, and other video processing tasks.

Method 400 starts at step 402 with receiving input video data.

Method 400 then proceeds to step 404 with sampling a first subset of clips from the input video data.

Method 400 then proceeds to step 406 with providing the first subset of clips to a first component of a machine learning model to generate a first output. In some examples, the second component of the machine learning model comprises student model 212, as described above with respect to FIG. 2.

Method 400 then proceeds to step 408 with sampling a second subset of clips from the input video data. As described above, the second subset of clips may generally comprise fewer clips than the first subset of clips.

Method 400 then proceeds to step 410 with providing the second subset of clips to a second component of the machine learning model to generate a second output. In some examples, the second component of the machine learning model comprises teacher model 202, as described above with respect to FIG. 2.

Method 400 then proceeds to step 412 with aggregating the first output from the first component of the machine learning model (based on the first subset of clips) with the second output from the second component of the machine learning model (based on the second subset of clips) to generate aggregated output.

Method 400 then proceeds to step 414 with determining a characteristic of the input video data based on the aggregated output.

In some aspects, aggregating the first output from the first component of the machine learning model with the second output from the second component of the machine learning model comprises applying a cross-attention technique to the first output and the second output, such as described above with respect to 222 in FIG. 2. In some cases, the cross-attention technique comprises performing a scaled dot-product operation between the first output from the first component of the machine learning model and the second output from the second component of the machine learning model.

In some aspects, the first component of the machine learning model comprises: a first convolutional neural network component; a first temporal feature fusion component; and a cross-attention component, such as described with respect to 211, 216, and 222, respectively, of FIG. 2.

In some aspects, the second component of the machine learning model comprises: a second convolutional network component; and a second temporal feature fusion component, such described with respect to 201 and 206, respectively, of FIG. 2. In some aspects, the first convolutional neural network component is smaller than the second convolutional network component. For example, the first convolutional neural network component may have fewer nodes, fewer layers, fewer connections, fewer parameters, and/or may generally require fewer computations (e.g., floating point operations) for input data compared to the second convolutional network component.

In some aspects, the characteristic of the input video data comprises an action depicted in the input video data. In other aspects, the characteristic comprises a classification of the input video data. In yet further aspects, the characteristic comprises an action localization in the input video data. Note that these are just some examples, and other characteristics are possible.

In some aspects, each clip of the first subset of clips and the second subset of clips consists of a single video frame.

In some aspects, sampling the first subset of clips form the input video data comprises uniformly sampling the first subset of clips according to a first sampling interval. In some aspects, sampling the second subset of clips form the input video data comprises uniformly sampling the second subset of clips according to a second sampling interval. In some aspects, the second sampling interval is longer than the first sampling interval. In some aspects, the first subset of clips comprises no clips from the second subset of clips. In some aspects, sampling is performed as described with respect to FIG. 3.

In some aspects, the first temporal feature fusion component comprises a first self-attention mechanism, and the second temporal feature fusion component comprises a second self-attention mechanism.

In some aspects, determining a characteristic of the input video data based on the aggregated output comprises providing the aggregated output to a classification component of the machine learning model.

In some aspects, the classification component comprises a linear classifier.

Though not depicted in FIG. 4, method 400 may further include calculating a video classification loss based on the determined characteristic of the input video data; and updating the machine learning model based on the video classification loss.

In some aspects, the video classification loss comprises a clip classification loss component and a cross-attention loss component.

Example Processing System

Figure 5:
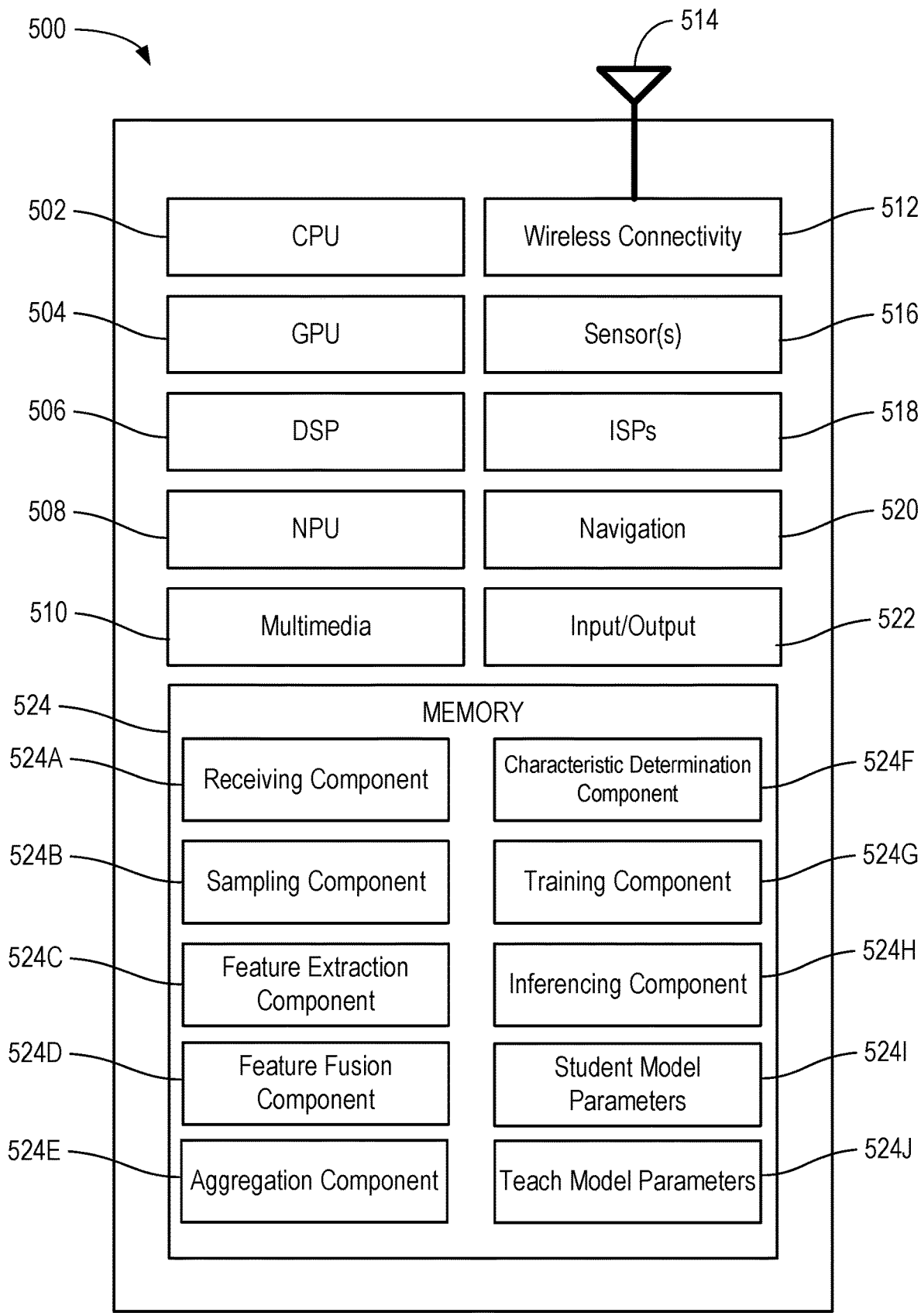
FIG. 5 depicts an example processing system that may be configured to perform the methods described herein.

FIG. 5 depicts an example processing system 500 that may be configured to perform the methods described herein, such as with respect to FIGS. 1-4.

Processing system 500 includes a central processing unit (CPU) 502, which in some examples may be a multi-core CPU. Instructions executed at the CPU 502 may be loaded, for example, from a program memory associated with the CPU 502 or may be loaded from memory 524.

Processing system 500 also includes additional processing components tailored to specific functions, such as a graphics processing unit (GPU) 504, a digital signal processor (DSP) 506, a neural processing unit (NPU) 508, a multimedia processing unit 510, and a wireless connectivity component 512.

In some aspects, one or more of CPU 502, GPU 504, DSP 506, and NPU 508 may be configured to perform the methods described herein with respect to FIGS. 1-4.

An NPU, such as 508, is generally a specialized circuit configured for implementing all the necessary control and arithmetic logic for executing machine learning algorithms, such as algorithms for processing artificial neural networks (ANNs), deep neural networks (DNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

NPUs, such as 508, may be configured to accelerate the performance of common machine learning tasks, such as image classification, machine translation, object detection, and various other tasks. In some examples, a plurality of NPUs may be instantiated on a single chip, such as a system on a chip (SoC), while in other examples they may be part of a dedicated machine learning accelerator device.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In some embodiments, NPU 508 may be implemented as a part of one or more of CPU 502, GPU 504, and/or DSP 506.

In some embodiments, wireless connectivity component 512 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 512 is further connected to one or more antennas 514.

Processing system 500 may also include one or more sensor processing units 516 associated with any manner of sensor, one or more image signal processors (ISPs) 518 associated with any manner of image sensor, and/or a navigation processor 520, which may include satellite-based positioning system components (e.g., GPS or GLONASS) as well as inertial positioning system components.

Processing system 500 may also include one or more input and/or output devices 522, such as screens, touch-sensitive surfaces (including touch-sensitive displays), physical buttons, speakers, microphones, and the like.

In some examples, one or more of the processors of processing system 500 may be based on an ARM or RISC-V instruction set.

Processing system 500 also includes memory 524, which is representative of one or more static and/or dynamic memories, such as a dynamic random access memory, a flash-based static memory, and the like. In this example, memory 524 includes computer-executable components, which may be executed by one or more of the aforementioned components of processing system 500.

In particular, in this example, memory 524 includes receiving component 524A, sampling component 524B, feature extraction component 524C, feature fusion component 524D, aggregation component 524E, characteristic determination component 524F, training component 524G, inferencing component 524H, student model parameters 524I (e.g., weights, biases, and other machine learning model parameters), and teacher model parameters 524J. One or more of the depicted components, as well as others not depicted, may be configured to perform various aspects of the methods described herein.

Generally, processing system 500 and/or components thereof may be configured to perform the methods described herein.

Notably, in other embodiments, aspects of processing system 500 may be omitted, such as where processing system 500 is a server computer or the like. For example, multimedia component 510, wireless connectivity 512, sensors 516, ISPs 518, and/or navigation component 520 may be omitted in other embodiments. Further, aspects of processing system 500 maybe distributed.

Note that FIG. 5 is just one example, and in other examples, alternative processing system with fewer, additional, and/or alternative components may be used.

Example Clauses

Implementation examples are described in the following numbered clauses:

Clause 1: A method of processing video data, comprising: receiving input video data; sampling a first subset of clips from the input video data; providing the first subset of clips to a first component of a machine learning model to generate first output; sampling a second subset of clips from the input video data, wherein the second subset of clips comprises fewer clips than the first subset of clips; providing the second subset of clips to a second component of the machine learning model to generate second output; aggregating the first output from the first component of the machine learning model with the second output from the second component of the machine learning model to generate aggregated output; and determining a characteristic of the input video data based on the aggregated output.

Clause 2: The method of Clause 1, wherein aggregating the first output from the first component of the machine learning model with the second output from the second component of the machine learning model comprises applying a cross-attention technique to the first output and the second output.

Clause 3: The method of Clause 2, wherein the cross-attention technique comprises performing a scaled dot-product operation between the first output from the first component of the machine learning model and the second output from the second component of the machine learning model.

Clause 4: The method of any one of Clauses 1-3, wherein the first component of the machine learning model comprises: a first convolutional neural network component; a first temporal feature fusion component; and a cross-attention component.

Clause 5: The method of Clause 4, wherein the second component of the machine learning model comprises: a second convolutional network component; and a second temporal feature fusion component.

Clause 6: The method of Clause 5, wherein the first convolutional neural network component is smaller than the second convolutional network component.

Clause 7: The method of any one of Clauses 1-6, wherein the characteristic of the input video data comprises an action depicted in the input video data.

Clause 8: The method of any one of Clauses 1-6, wherein the characteristic comprises a classification of the input video data.

Clause 9: The method of any one of Clauses 1-6, wherein the characteristic comprises an action localization in the input video data.

Clause 10: The method of any one of Clauses 1-6, wherein the characteristic comprises a video understanding.

Clause 11: The method of any one of Clauses 1-6, wherein the characteristic comprises a video inpainting determination comprising synthesized video content.

Clause 12: The method of any one of Clauses 1-6, wherein the characteristic comprises an answer based on a query of the input video data.

Clause 13: The method of any one of Clauses 1-12, wherein each clip of the first subset of clips and the second subset of clips consists of a single video frame.

Clause 14: The method of any one of Clauses 1-13, wherein: sampling the first subset of clips from the input video data comprises uniformly sampling the first subset of clips according to a first sampling interval, sampling the second subset of clips from the input video data comprises uniformly sampling the second subset of clips according to a second sampling interval, and the second sampling interval is longer than the first sampling interval.

Clause 15: The method of any one of Clauses 1-14, wherein the first subset of clips comprises no clips from the second subset of clips.

Clause 16: The method of Clause 6, wherein: the first temporal feature fusion component comprises a first self-attention mechanism, and the second temporal feature fusion component comprises a second self-attention mechanism.

Clause 17: The method of any one of Clauses 1-16, wherein determining a characteristic of the input video data based on the aggregated output comprises providing the aggregated output to a classification component of the machine learning model.

Clause 18: The method of Clause 17, wherein the classification component comprises a linear classifier.

Clause 19: The method of any one of Clauses 1-18, further comprising: calculating a video classification loss based on the determined characteristic of the input video data; and updating the machine learning model based on the video classification loss.

Clause 20: The method of Clause 19, wherein the video classification loss comprises a clip classification loss component and a cross-attention loss component.

Clause 21: A processing system, comprising: a memory comprising computer-executable instructions; and one or more processors configured to execute the computer-executable instructions and cause the processing system to perform a method in accordance with any one of Clauses 1-20.

Clause 22: A processing system, comprising means for performing a method in accordance with any one of Clauses 1-20.

Clause 23: A non-transitory computer-readable medium comprising computer-executable instructions that, when executed by one or more processors of a processing system, cause the processing system to perform a method in accordance with any one of Clauses 1-20.

Clause 24: A computer program product embodied on a computer-readable storage medium comprising code for performing a method in accordance with any one of Clauses 1-20.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method of processing video data, comprising:
   receiving input video data;
   sampling a first subset of clips from the input video data;
   providing the first subset of clips to a first component of a machine learning model to generate a first output;
   sampling a second subset of clips from the input video data, wherein the second subset of clips comprises fewer clips than the first subset of clips;
   providing the second subset of clips to a second component of the machine learning model to generate a second output;
   aggregating the first output from the first component of the machine learning model with the second output from the second component of the machine learning model to generate aggregated output; and
   determining a characteristic of the input video data based on the aggregated output.

2. The method of claim 1, wherein aggregating the first output from the first component of the machine learning model with the second output from the second component of the machine learning model comprises applying a cross-attention technique to the first output and the second output.

3. The method of claim 2, wherein the cross-attention technique comprises performing a scaled dot-product operation between the first output from the first component of the machine learning model and the second output from the second component of the machine learning model.

4. The method of claim 1, wherein the first component of the machine learning model comprises:
   a first convolutional neural network component;
   a first temporal feature fusion component; and
   a cross-attention component.

5. The method of claim 4, wherein the second component of the machine learning model comprises:
   a second convolutional network component; and
   a second temporal feature fusion component.

6. The method of claim 5, wherein the first convolutional neural network component is smaller than the second convolutional network component.

7. The method of claim 1, wherein the characteristic of the input video data comprises one of:
   an action depicted in the input video data;
   a classification of the input video data;
   an action localization in the input video data;
   a video understanding;
   a video inpainting determination comprising synthesized video content; or
   an answer based on a query of the input video data.

8. The method of claim 1, wherein each clip of the first subset of clips and the second subset of clips consists of a single video frame.

9. The method of claim 1, wherein:
   sampling the first subset of clips from the input video data comprises uniformly sampling the first subset of clips according to a first sampling interval, sampling the second subset of clips from the input video data comprises uniformly sampling the second subset of clips according to a second sampling interval, and the second sampling interval is longer than the first sampling interval.

10. The method of claim 1, wherein the first subset of clips comprises no clips from the second subset of clips.

11. The method of claim 6, wherein:
the first temporal feature fusion component comprises a first self-attention mechanism, and
the second temporal feature fusion component comprises a second self-attention mechanism.

12. The method of claim 1, wherein determining a characteristic of the input video data based on the aggregated output comprises providing the aggregated output to a classification component of the machine learning model.

13. The method of claim 12, wherein the classification component comprises a linear classifier.

14. The method of claim 1, further comprising:
calculating a video classification loss based on the determined characteristic of the input video data; and
updating the machine learning model based on the video classification loss.

15. The method of claim 14, wherein the video classification loss comprises a clip classification loss component and a cross-attention loss component.

16. A processing system, comprising:
a memory comprising computer-executable instructions; and
a processor configured to execute the computer-executable instructions and cause the processing system to:
receive input video data;
sample a first subset of clips from the input video data;
provide the first subset of clips to a first component of a machine learning model to generate a first output;
sample a second subset of clips from the input video data, wherein the second subset of clips comprises fewer clips than the first subset of clips;
provide the second subset of clips to a second component of the machine learning model to generate a second output;
aggregate the first output from the first component of the machine learning model with the second output from the second component of the machine learning model to generate aggregated output; and
determine a characteristic of the input video data based on the aggregated output.

17. The processing system of claim 16, wherein in order to aggregate the first output from the first component of the machine learning model with second output from the second component of the machine learning model, the processor is configured to further cause the processing system to apply a cross-attention technique to the first output and the second output.

18. The processing system of claim 17, wherein in order to apply the cross-attention technique, the processor is configured to further cause the processing system to perform a scaled dot-product operation between the first output from the first component of the machine learning model and the second output from the second component of the machine learning model.

19. The processing system of claim 16, wherein the first component of the machine learning model comprises:
a first convolutional neural network component;
a first temporal feature fusion component; and
a cross-attention component.

20. The processing system of claim 19, wherein the second component of the machine learning model comprises:
a second convolutional network component; and
a second temporal feature fusion component.

21. The processing system of claim 20, wherein the first convolutional neural network component is smaller than the second convolutional network component.

22. The processing system of claim 16, wherein the characteristic of the input video data comprises one of:
an action depicted in the input video data;
a classification of the input video data;
an action localization in the input video data;
a video understanding;
a video inpainting determination comprising synthesized video content; or
an answer based on a query of the input video data.

23. The processing system of claim 16, wherein each clip of the first subset of clips and the second subset of clips consists of a single video frame.

24. The processing system of claim 16, wherein:
sampling the first subset of clips from the input video data comprises uniformly sampling the first subset of clips according to a first sampling interval,
sampling the second subset of clips from the input video data comprises uniformly sampling the second subset of clips according to a second sampling interval, and
the second sampling interval is longer than the first sampling interval.

25. The processing system of claim 16, wherein the first subset of clips comprises no clips from the second subset of clips.

26. The processing system of claim 21, wherein:
the first temporal feature fusion component comprises a first self-attention mechanism, and
the second temporal feature fusion component comprises a second self-attention mechanism.

27. The processing system of claim 16, wherein in order to determine a characteristic of the input video data based on the aggregated output, the processor is configured to further cause the processing system to provide the aggregated output to a classification component of the machine learning model.

28. The processing system of claim 16, wherein the processor is configured to further cause the processing system to:
calculate a video classification loss based on the determined characteristic of the input video data; and
update the machine learning model based on the video classification loss.

29. The processing system of claim 28, wherein the video classification loss comprises a clip classification loss component and a cross-attention loss component.

30. A non-transitory computer-readable medium comprising computer-executable instructions that, when executed by one or more processors of a processing system, cause the processing system to perform a method of processing video data, the method comprising:
receiving input video data;
sampling a first subset of clips from the input video data;
providing the first subset of clips to a first component of a machine learning model to generate a first output;
sampling a second subset of clips from the input video data, wherein the second subset of clips comprises fewer clips than the first subset of clips;

providing the second subset of clips to a second component of the machine learning model to generate a second output;
aggregating the first output from the first component of the machine learning model with the second output from the second component of the machine learning model to generate aggregated output; and
determining a characteristic of the input video data based on the aggregated output.

* * * * *